Figure 8:
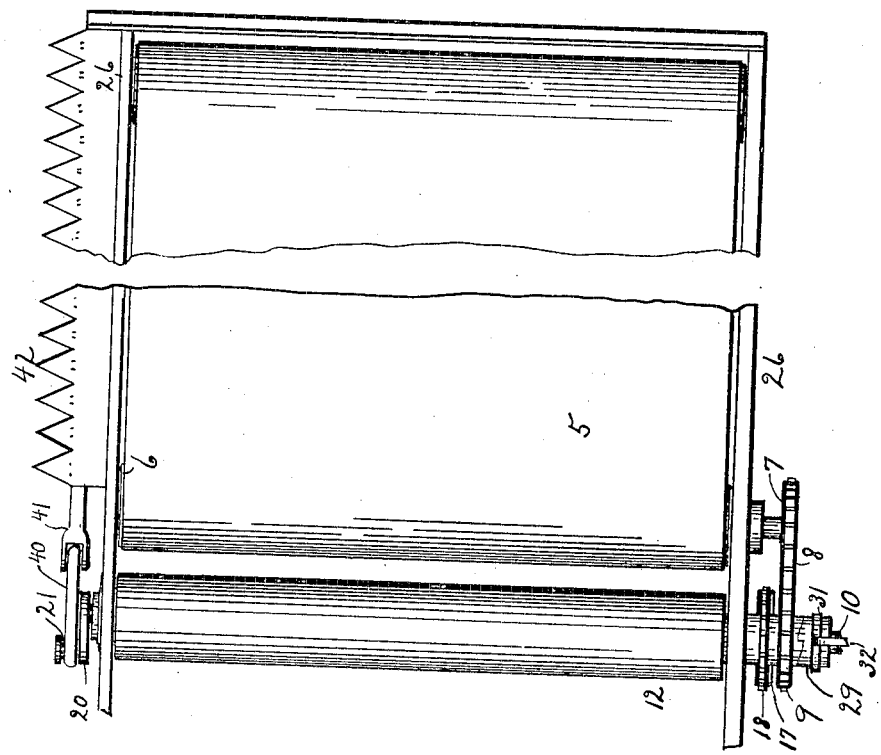

No. 843,279. PATENTED FEB. 5, 1907.
W. JACOBS.
HEADER.
APPLICATION FILED APR. 2, 1906.
2 SHEETS—SHEET 1.
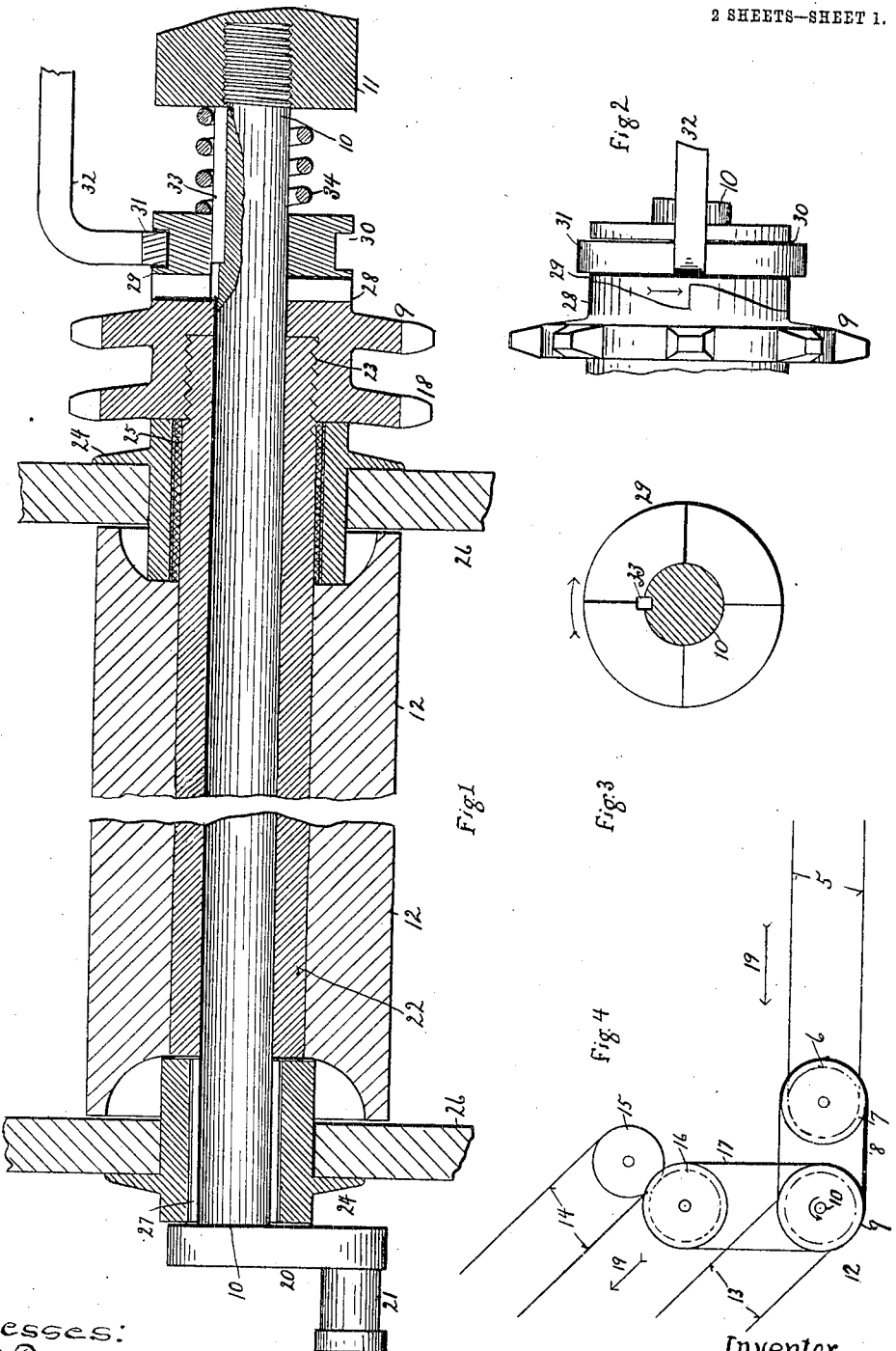
Witnesses:
P. T. Fisher
John A. Hulit
Inventor
Winford Jacobs
By J. A. Rosen atty No. 843,279.

PATENTED FEB. 5, 1907.

W. JACOBS.
HEADER.
APPLICATION FILED APR. 2, 1906.

2 SHEETS—SHEET 2.

Witnesses

Inventor
Winfred Jacobs
By J. A. Rosen atty

UNITED STATES PATENT OFFICE.

WINFRED JACOBS, OF DODGE CITY, KANSAS.

HEADER.

No. 843,279.  Specification of Letters Patent.  Patented Feb. 5, 1907.

Application filed April 2, 1906. Serial No. 309,319.

*To all whom it may concern:*

Be it known that I, WINFRED JACOBS, a citizen of the United States, residing at Dodge City, in the county of Ford and State of Kansas, have invented a new and useful Improvement in Headers, of which the following is a specification.

Objects of the invention are to improve upon the efficiency of the headers now in general use by providing against the delays and the waste of grain in the field. I cite as illustrating the causes of delay the changing of the header-boxes or header-wagons, when the header itself must be stopped while the exchange is being made, as otherwise the heads would be thrown from the elevator onto the ground, there being no provision for stopping the elevator or other carriers in the header while the sickle continues to operate; and I call attention in illustrating the waste of the grain on the ground in the field to the turning of corners where the turn is made too closely for the header-wagons to follow. In such case the elevator continues to operate, and thus to throw the heads onto the ground. These cases are merely illustrative of the difficulties sought to be overcome by my invention; but it will be found of constant service in the field.

The invention consists of providing a means for operating the carriers and the sickle in a measure independently of each other.

It consists of providing a means for operating the sickle and the carriers and a means for operating the sickle independently of the carriers.

It consists, further, of a suitable transmission between the bull-wheel and the sickle and a clutch mechanism whereby the carriers or the platform or elevator, or both canvases, may be operated with the sickle or may be stopped while the sickle continues; and it consists, further, of the parts, improvements, and combinations hereinafter set forth and claimed.

With this improvement applied to such headers as the McCormick and the Deering headers I am enabled to prevent the delays and waste above referred to.

Where the harvesting time is very short and the area to be covered is very large, as in my part of the country, the prevention of delay and waste is a matter of prime importance.

In the drawings accompanying and forming part of this specification and in the description thereof I have illustrated the invention in its preferred form and have shown the best mode of applying the principles thereof; but it is to be understood that the invention itself is not confined to the drawings and the description of the drawings; that it may be applied to other uses; that parts and combinations thereof as separately claimed may be used either with or without the other connecting devices of similar general nature, and that I contemplate changes in form, proportions, materials, arrangement, the transposition of parts, and the substitution of equivalent members without departing from the spirit of the invention.

Figure 1 is a longitudinal central section of the lower roller of the elevator-canvas, showing how my invention is applied to the headers now in general use, such as the McCormick and the Deering. Fig. 2 is a top view showing especially the clutch whereby the canvases are thrown into operation with the shaft or are thrown out of operation while the sickle continues. Fig. 3 is a face view of the member 29 of the clutch. Fig. 4 is an outline of the platform-canvas and the elevator-canvases, showing also the shaft by which they and the sickle are driven and to which my invention is applied. Fig. 5 is a plan view giving a general view of the platform-canvas and the sickle, said view being partially broken away and not showing the elevator-canvases.

Like reference-numerals indicate like or corresponding parts throughout the several views.

Referring first to Fig. 4, which shows in outline the arrangement of the rollers and canvases of the common type of headers above referred to, 5 is the platform-canvas, which is located immediately behind the sickle 42 and serves to carry the heads from the sickle to the elevator. 6 is the roller therefor. 7 is a sprocket secured to the roller. 8 is a sprocket-chain for driving the sprocket 7 by the sprocket 9. 10 is the shaft, which is driven by suitable transmission from the bull-wheel and on the other end of which is a crank-arm 20 and pin 21, (see Fig. 1,) to which is secured the pitman-rod 40, which operates the movable sickle-knives 41 of the sickle 42. 12 is the wooden roller mounted on the shaft for operating the lower endless canvas 13 of the elevator, the upper canvas 14 of which is operated on and by a similar roller 15 through transmission devices 16 17 18 in unison with the lower canvas, so as to carry the heads up between the two elevator-canvases. These parts of the apparatus are now in use, the roller 12 being fixed to the shaft 10; but as now constructed they are always operable together, and no provision is made for permitting the sickle to continue while the machine is moving along and also permitting the canvases to remain stationary. True, the entire apparatus may be thrown out of gear; but this would not permit the sickle to cut the grain.

Referring to the enlarged details in Figs. 1, 2, and 3, 11 may represent the joining end of the transmission from the traction-wheel by which the sickle and canvases are driven. Instead of fixing the roller 12 onto the shaft 10 I mount upon said shaft loosely a sleeve 22, and I secure the roller 12 onto this sleeve by any suitable means, so that the roller will always revolve with the sleeve. The sleeve extends out through the bearing 24, secured to framework 26, and its end is threaded into the two drive-sprockets 9 and 18, it being understood that the purpose of these sprockets is to operate the platform-canvas 5 and the upper elevator-canvas 14, substantially as shown in Fig. 4, so that the three canvases are always operable together. The shaft 10 at the other end extends through the bearing 24 in the framework 26 and may be mounted on rollers 27. Sleeve 22 may be provided with a bushing 25.

The sprockets 9 and 18 may be made integral with the one member 28 of a clutch, the other member 29 of which is keyed at 33 onto the shaft 10, but movable lengthwise thereon. A compression-spring 34 tends normally to hold the two members together, so that whenever the shaft 10 is rotated by the transmission 11 the sprockets and rollers are also all operated together, just as in the headers now in use. The clutch member 29 has a groove 30, in which is placed a yoke or collar 31, provided with an operating-rod 32, which may be extended to any suitable place or in any suitable form for operation, the purpose being to withdraw the member 29 from engagement with member 28, whereby the shaft 10 may continue to rotate and to operate the sickle, but without operating the canvases. The clutch is to be so connected as to be convenient to the driver or person attending the header.

Normally the header provided with my device will operate just as the machines now in use—that is, the sickle and the canvases will always operate together—but in addition my improvement provides for permitting the sickle to continue while the canvases are stopped by merely shifting the lever or rod 32. In the case of exchanging header-wagons, above alluded to, it will not be necessary to stop the header during such exchange. The header may continue; but while the loaded wagon is driving out from under the elevator and the empty one is taking its place the operator will shift the rod 32, thereby throwing the canvases out of gear and stopping them, though the sickle continues to cut the grain, and the grain is stored on the platform-canvas. When the empty wagon is in place, the rod 32 may be released, and thus again start the canvases, as before, and thus there is no delay in exchanging the header-wagons. Again, in the illustrative case of turning a corner where the turn is made too closely to permit the header-wagon to follow during such turn the operator shifts the rod 32, thus stopping the canvases and storing the grain on the platform canvas until the header-wagon is again in place, when the rod 32 is released. It often happens in cleaning up a field a narrow strip of light grain will be left. With my improvement applied to the header a narrow strip of light grain may be cut without the attendance of a header-wagon by shifting the rod 32 and carrying the entire load on the platform, or the elevator itself may also be filled by releasing said rod 32 just long enough to permit the grain to be carried to the top and then shifting it again to hold the balance of the straw on the platform.

As heretofore stated, it is of frequent occurrence that the header should continue to move on, but when it is either impossible or not economical for the header-wagon to attend, and in all of these cases a header provided with my improvement can continue to cut the straw and at the same time store it without either loss or delay.

What I claim as new, and desire to secure by Letters Patent, is—

1. In a header of the kind described, the combination of a sickle and a sickle-operating shaft 10, power-transmission mechanism 11 therefor, carriers, power-transmission mechanism between the shaft and the carriers including a clutch under the operator's control for connecting said carriers with and disconnecting them from said shaft at will.

2. In a header of the kind described, the combination of a sickle and a sickle-operating shaft, power-transmission mechanism 11 therefor, a platform-carrier, elevator-carriers, a sleeve loosely mounted on the shaft, sprockets secured to the sleeve for operating the carriers, a clutch between said sleeve and said shaft comprising the two members 28 and 29, one member being secured to the sleeve and the other member being secured to the shaft but movable lengthwise thereon, a compression-spring for normally holding the clutch members engaged, and a means for disengaging them.

3. In a header, the combination of a sickle and a sickle-operating shaft and power devices therefor, a sleeve loosely mounted thereon, a roller fixedly mounted on the sleeve, a bearing at the sickle end for the shaft and a bearing at the other end for the sleeve, a sprocket secured to the sleeve for driving the carriers, a clutch between said shaft and said sleeve or sprocket comprising the two members 28 and 29, the member 28 being made integral with said sprocket and the member 29 being keyed to the shaft but movable lengthwise thereon, a compression-spring for holding the clutch members engaged, an operating-rod for shifting the clutch member 29, a platform-carrier and elevator-carriers, substantially as set forth.

In testimony whereof I have hereunto signed my name in the presence of subscribing witnesses.

WINFRED JACOBS.

Witnesses:
JOHN A. HULIT,
Z. T. FISHER.